US010534436B2

(12) United States Patent
Kamovich et al.

(10) Patent No.: US 10,534,436 B2
(45) Date of Patent: Jan. 14, 2020

(54) MULTI-MODAL GESTURE BASED INTERACTIVE SYSTEM AND METHOD USING ONE SINGLE SENSING SYSTEM

(71) Applicant: SOFTKINETIC SOFTWARE, Brussels (BE)

(72) Inventors: Aliaksandr Kamovich, Uccle (BE); Julien Thollot, Woluwe-Saint-Lambert (BE); Laurent Guigues, Seattle, WA (US)

(73) Assignee: Sony Depthsensing Solutions SA/NV, Brussels (BE)

( * ) Notice: Subject to any disclaimer, the term of this patent is extended or adjusted under 35 U.S.C. 154(b) by 349 days.

(21) Appl. No.: 15/109,148

(22) PCT Filed: Jan. 30, 2015

(86) PCT No.: PCT/EP2015/052022
§ 371 (c)(1),
(2) Date: Jun. 30, 2016

(87) PCT Pub. No.: WO2016/119906
PCT Pub. Date: Aug. 4, 2016

(65) Prior Publication Data
US 2016/0364007 A1 Dec. 15, 2016

(51) Int. Cl.
*G06F 3/01* (2006.01)
*G06F 3/0488* (2013.01)
(Continued)

(52) U.S. Cl.
CPC .............. *G06F 3/017* (2013.01); *G06F 3/005* (2013.01); *G06F 3/011* (2013.01); *G06F 3/016* (2013.01);
(Continued)

(58) Field of Classification Search
CPC ............... G06F 3/04883; G06F 3/0488; G06F 3/04855; G06F 3/0425; G06F 3/017
See application file for complete search history.

(56) References Cited

U.S. PATENT DOCUMENTS

2010/0104134 A1 4/2010 Wang et al.
2011/0032203 A1* 2/2011 Pryor ................... G06F 3/0312
345/173

(Continued)

FOREIGN PATENT DOCUMENTS

WO 2013147804 A1 10/2013
WO 2014125482 A1 8/2014

OTHER PUBLICATIONS

ISA/EP International Search Report dated Sep. 23, 2015 re PCT Application No. PCT/EP2015/052022, filed Jan. 30, 2015.
(Continued)

*Primary Examiner* — David E Choi
(74) *Attorney, Agent, or Firm* — Wolf, Greenfield & Sacks, P.C.

(57) ABSTRACT

Described herein is a method and a system for providing efficient and complementary natural multi-modal gesture based interaction with a computerized system which displays visual feedback information on a graphical user interface on an interaction surface. The interaction surface is within the frustum of an imaging device comprising a single sensing system. The system uses the single sensing system for detecting both touch gesture interactions with the interaction surface (120) and three-dimensional touch-less gesture interactions in areas or volumes above the interaction surface performed by hands of a user. Both types of interaction are associated contextually with an interaction command controlling the computerized system when the gesture has been detected. The system comprises preferably a projection system for displaying the graphical user interface and
(Continued)

visual feedback on the interaction surface, the projection system being locatable on the same side or on the opposite side of the interaction surface to the sensing system.

20 Claims, 6 Drawing Sheets

(51) Int. Cl.
  *G06F 3/03* (2006.01)
  *G06F 3/042* (2006.01)
  *G06F 3/00* (2006.01)
  *G06F 3/0485* (2013.01)

(52) U.S. Cl.
  CPC ............ *G06F 3/0304* (2013.01); *G06F 3/042* (2013.01); *G06F 3/0425* (2013.01); *G06F 3/0488* (2013.01); *G06F 3/04855* (2013.01); *G06F 3/04883* (2013.01)

(56) References Cited

U.S. PATENT DOCUMENTS

| | | | | |
|---|---|---|---|---|
| 2013/0147711 A1* | 6/2013 | Njolstad | ................ | G06F 3/011 345/158 |
| 2014/0104206 A1* | 4/2014 | Anderson | ............... | G06F 3/017 345/173 |
| 2014/0267084 A1 | 9/2014 | Krulce et al. | | |
| 2014/0375577 A1* | 12/2014 | Yeh | ........................ | G06F 3/0416 345/173 |
| 2016/0364007 A1* | 12/2016 | Kamovich | ............ | G06F 3/0488 |

OTHER PUBLICATIONS

European Communication for European Application No. 15703923.1 dated Jul. 27, 2018.

* cited by examiner

MULTI-MODAL GESTURE BASED INTERACTIVE SYSTEM AND METHOD USING ONE SINGLE SENSING SYSTEM

CROSS REFERENCE TO RELATED APPLICATIONS

This application claims the benefit under 35 U.S.C. § 371 as a U.S. National Stage Entry of International Application No. PCT/EP2015/052022, filed in the European Patent Office as a Receiving Office on Jan. 30, 2015, the entire contents of which is hereby incorporated by reference in its entirety.

FIELD OF THE INVENTION

The present invention relates to improvements in or relating to multi-modal human to computer interactive systems, and is more particularly concerned with a method and a system for providing two complementary modes of interaction using a single sensing means, for example, a three-dimensional imaging system being operated for gesture recognition, the two modes of interaction being respectively touch gesture interactions and three-dimensional touchless gesture interactions.

BACKGROUND OF THE INVENTION

Conventional human-to-computer interfaces include hardware control system interfaces, such as, keyboards, mice, remote control, pads, touch screens and pointing devices. With such interfaces, a physical action needs to be performed on the hardware device itself, for example, touching, moving, holding, pointing, pressing, moving, clicking, or even a plurality of these actions together, sequentially or simultaneously, in a way enabled by these device interfaces so that control commands, such as, triggered binary events or continuous values, can be sent to a computer system with which the interface is intended to interact.

The computer system often comprises a graphical user interface (GUI) having windows, buttons and other items or elements, all together termed the parameters, which are displayed on screens for providing visual feedback to a user as a function of control commands triggered and executed; they are designed in accordance with usability and ergonomics of conventional human-to-computer hardware interfaces and with respect to two-dimensional capabilities of mainstream display systems. For instance, operating systems have basically two-dimensional GUI windows which often comprise scroll bars for enabling navigation within a media content, such as, a map, an image or a text box, the size of which being potentially larger than the image displayed within the area delimited by the size of the display screen size itself. Interaction with the scroll bars is optimized for using a wheel on a mouse hardware device, or by combining motion of the mouse cursor with a holding click action. In addition, conventional GUIs often comprise two-dimensional buttons on which a user clicks with mouse buttons for zooming into and out of the content of the GUI when the mouse cursor representation is pointing the specifically determined button area.

Moreover, conventional two-dimensional GUIs may also comprise map navigation GUI interactions which usually require a click combined with a continuous mouse movement to make the map scroll as function of the mouse movement or to change from one map area to the other.

More recently, conventional two-dimensional GUIs have been developed in order to be operated by touch and/or multi-touch control interfaces, such as, multi-touch enabled surface and display screens. The control commands of these second generation touch-gesture based interfaces have been designed for enabling a user to interact, click, scroll or zoom in and out, using at least one portion of at least one hand, for example, a finger, and may be based on different kinds of hardware technologies, such as capacitive, resistive, infra-red grid, optical imaging, dispersive signal or acoustic wave based technologies.

Even more recently, a third generation of control system interfaces have become available. This generation comprises contactless interaction systems. These systems may be based also on capacitive motion-tracking sensor and comprise a system including electrodes and interface electronics. The main advantage of the use of such capacitive sensors over existing control systems is that they have low power consumption, provide seamless integration, and are of low cost. However, capacitive sensors only enable very close range contactless interactions, for example, within a distance of between 0 cm and 10 cm from the plane of the electrodes, with the capability to distinguish and track a very limited number of point of interests or extremities at the same time, such as human fingers, typically only one or two. These capacitive motion-tracking sensors are commonly associated with another interaction system from the first or second generation of control interfaces, such as a touch screen system, in order to enable both touch and touch-less or contact-less gesture interactions. However, such sensors are not complementary enough for being used efficiently for combining touch and touch-less three-dimensional gesture recognition where control gestures are performed in the air by a user, for example, using both hands and a plurality of fingers, for example 6, at varying distances between 0 cm and 150 cm from an interaction surface.

These third generation of contactless interaction systems may also be based on an imaging system, for example, two-dimensional or three-dimensional camera devices, for sequentially capturing images of a scene with respect to time, and, a method for determining three-dimensional gestures performed by a user within the captured scene. Such contactless interactions systems are compliant for being used in combination with existing conventional hardware interfaces, such as touch-screen displays, or, optionally, alone by triggering the same control commands as said conventional hardware interfaces but from a set of recognized three-dimensional gestures, namely static poses or dynamics poses, within the sequentially captured images of the scene.

One such multi-modal interaction system utilizing a 3D camera based touch-less gesture recognition system combined with another hardware device interactive system is described in WO-A-2013/104681. In WO-A-2013/104681, a novel hand-held wireless remote control device system is described. It can be used to provide conventional hardware-based remote control signals for interacting with a computer system in association with three dimensional gesture-based control signals provided by the gesture recognition system. The hand-held wireless remote control device comprises a housing having a sensing unit, and having at least one control button which is capable of generating or triggering a control signal for the associated computerized system. The computerized system uses information obtained from the control device together with information obtained from a gesture recognition system in a multi-modal way to resolve any ambiguities due to, for example, occlusion of the hand performing the gesture or the hand being outside the field of view of the imaging system associated with the computerized system, and to trigger interactions within the gesture based interaction system. Operated in a multi-modal way, the two different interaction systems are used efficiently in combination and each is delivering signals to be used for enhancing the signals from the other thereby enabling an enhanced human-to-computer interaction which cannot be provided if using only one of the two interaction systems.

Another contactless interaction system uses a video camera and a computer screen system is described in WO-A-99/40562. The system comprises a touch-screen like data entry system determined from video images comprising data relating to objects approaching the computer screen. The video camera system is mounted above the computer screen for monitoring the area immediately in front of the screen. Processing of the images enables detection and tracking of a hand of user or of a pen within the foreground of the screen using common background removal techniques. A calibration process is used in which calibration points are located so that they cover most of the screen, the calibration process generating screen spatial coordinates by transforming virtual space coordinates of the tracked hand position using means like linear interpolation and linear extrapolation.

In WO-A-02/03316, a passive capacitive touch screen is associated with at least a stereo vision camera based contactless interaction system. The low resolution, temperature and humidity dependence with low sealability capacitive touch system data are improved by information retrieved by the camera. The stereo vision camera based contactless interaction system comprises at least two cameras with overlapping fields of view which encompass the capacitive touch screen surface. The cameras acquire images of the touch surface from different locations and determine the exact location of a pointer relative to the touch surface when that pointer is captured in images acquired by the cameras. A calibration routine is used to facilitate object position determination using triangulation and taking into account offset angles of the cameras with respect to the touch surface. This enables enhanced determination of whether a pointer is in contact with the touch surface at a given point or hovering above the touch surface.

Whilst existing human-to-computer interactive systems enable multi-modal interactions based on touch interfaces and touch-less three dimensional gesture interfaces by associating at least two sensing systems having different technologies, for example, a capacitive touch screen associated with a three-dimensional touch-less gesture recognition system operated using depth information from a three-dimensional camera, there is still no solution for enabling accurate, reliable, efficient and cost effective multi-modal touch and touch-less three dimensional gesture based interfaces for controlling a computerized system in the same manner as a system utilizing a combination of different existing technologies.

Furthermore integration of two sensing systems having different technologies with a graphical user interface is always constrained by one of the technologies. For instance, when using a capacitive display screen for enabling touch-gesture interaction, the screen used has the main graphical user interface, and, adding another graphical user interface which, for instance, may have scalability properties, such as a projection system, requires adding complexity and cost to the existing system. In the same way, associating a plurality of display screens with a plurality of sensing systems does not provide a complete system being versatilite and embeddable, thereby enabling the interactive system to be operated anywhere and on any surface.

Last but not least, as integrating a plurality of sensing systems is constrained and made complex by the display system required by one of the sensing system, integration of natural interaction using a combination of both touch and touch-less three-dimensional gesture for operating in a natural way the multi-modal human-to-machine (or computer) interface tends to be rather limited in application, usability and in the ergonomics of the interaction process.

SUMMARY OF THE INVENTION

It is therefore an object of the present invention to provide a versatile multi-modal interaction system which overcomes the problems associated with the use of a plurality of sensing systems for enabling reliable simple and usable multi-modality. In particular the present invention comprises a novel method for using a single sensing system, either alone or in association with a single versatile display system, for providing a touch and touch-less gesture based interactive system having a graphical user interface, the method being versatile and ergonomic enough to be operated on different interaction surfaces which may be different to the one imposed by the single sensing system itself.

It is therefore also an object of the present invention to provide a novel natural multi-modal interaction system in which different interactions mode may easily be associated or combined with one another, either sequentially or simultaneously, for enabling human-to-computer interaction using at least one portion of at least one hand of a user, or another object, while being sufficiently versatile for enabling human-to-computer natural interactions using at least two portions of either one or two hands or more of one or multiple users.

In particular, it is therefore an object of the present invention to provide a versatile system for interacting with a graphical user interface, the system comprising: a display system for displaying a graphical user interface onto an interaction surface, a three-dimensional imaging system being operated for at least tracking at least one portion of at least one object or of at least one hand of a user within its frustum, and a computer system being configured for controlling the display system and the three-dimensional imaging system, as well as for determining gesture based interaction controls based on data output from the three-dimensional imaging system.

The present interactive system is further advantageously characterized in that the display surface for displaying the graphical user interface is situated in a portion of the frustum of the imaging system and is also substantially aligned therewith so that to minimize calibration issue and constraints. The term "substantially aligned" as used herein refers to the perspective of the display or interaction surface from the point of view of the camera, that is, the X-Y plane of the interaction surface being within a predetermined angle range with respect to the X-Y plane of the imaging system, for example, between 0 and 45 degrees.

Advantageously when considering embedded systems, the display system will comprise a projector element located on the same side of the interaction surface onto which the graphical user interface is displayed as the three-dimensional imaging device.

When considering interaction surfaces such as desks, tables or windows, the interactive system will preferably be configured so that the three-dimensional imaging system and the projector element are located on opposite sides of the interaction surface onto which the graphical user interface is projected. The interaction surface will being operable preferably for diffusing radiation having a wavelength in a range which substantially corresponds to the visible part of the electromagnetic spectrum and, for transmitting radiation having a wavelength in a range which substantially corresponds to the infrared part of the electromagnetic spectrum with limited diffusion, the transmission coefficient of the interaction surface being higher than 50% with a limited diffusion being lower than 20 degrees in the IR domain.

It is therefore another object of the present invention to provide a method for being operated by the interactive system, the method being stored in a non-transitory computer medium and operated as executable instructions by the interactive system.

The method is providing multi-modal touch and touchless interactions for controlling the computerized system in which said multi-modal touch and touch-less interaction are detected and recognized using data information from a single sensing system. The single sensing system is preferably a three-dimensional imaging device, and the method comprises the steps of:

detecting and tracking at least one portion of at least one object within a frustum of the three-dimensional imaging device;

initiating the interaction by determining if said at least one portion of said at least one object being tracked is performing at least one of: a predetermined touch gesture on a predetermined interactive area on the interaction surface and a predetermined touchless tree-dimensional gesture in a predetermined interactive volume along the normal vector axis of a predetermined interactive area;

interacting with the computerized system by detecting and recognizing the gestures performed by said at least one portion of said at least one object within the frustum of the three-dimensional imaging device, and wherein the detected and recognized gestures are at least one of: a predetermined touch gesture on the predetermined interactive area of the interaction surface, and a predetermined touch-less three-dimensional gesture in the predetermined interactive volume on the axis of vector normal to a predetermined interactive area.

Advantageously, detecting the performance of a touch gesture on a predetermined interactive area of the interaction surface corresponds to detecting when said at least one portion of said at least one object being tracked is positioned in three-dimensional space at the same location in space as the predetermined interactive area on the interaction surface.

In a preferred embodiment, detecting if a touch gesture has been performed may correspond to determining when the distance from the interaction surface of said at least one portion of said at least one object being tracked, in three-dimensional space, is below a predetermined threshold.

Similarly, the method further comprises determining if a multi-touch gesture is performed by detecting when the positions of at least two portions of said at least one object being tracked in space reach at least two predetermined interactive areas belonging to the interaction surface.

The method further comprises determining touch gesture interaction control commands as function of successive positions and durations of at least one of: a touch gesture and a multi-touch gesture.

Additionally, the method comprises also detection of three-dimensional touch-less gesture interactions and the determining of control commands contextually as function of the three-dimensional gesture performed by said at least one portion of said at least one object being tracked. By contextually is meant at what time, for how long and where in space relatively to the interaction areas and volumes of the interaction surface.

In a preferred embodiment, the method further comprises the step of ending a gesture based initiated interaction when a predetermined event is triggered, said predetermined event being at least one of: the elapsing of a predetermined time period, the recognition of a predetermined touch gesture on the interaction surface, the recognition of a predetermined three-dimensional touch-less gesture in the frustum of the three-dimensional imaging device, and an exit of said at least one object from a predetermined interactive volume in the three-dimensional space.

The method may use at least one first detected and tracked portion of at least one first object for initiating an interaction, and at least a second detected and tracked portion of said at least one first object for performing the interaction. The method may also use one single detected and tracked portion of one object sequentially for performing the initiating of the gesture interaction and the gesture interaction itself. The method may also use a plurality of detected and tracked objects from one or several objects for determining either touch-gestures, multi-touch gestures and three-dimensional gesture, the three dimensional gestures being static, for example a hand pose, or dynamic, for example a hand gesture with change of at least the arrangement in space of at least one portion detected and tracked on the hand.

Advantageously, the method comprises displaying a predetermined visual feedback on a graphical user interface on at least a portion of the interaction surface, said visual feedback being relative to at least one of: the position of said at least one portion of said at least one object and the recognized gestures of said at least one portion of said at least one object being tracked.

In particular, it is an object of the present invention to provide a method wherein the interaction with the graphical user interface displayed on the interaction surface further comprises operating the steps of:

determining the position in space and the topology of the interaction surface using the three-dimensional imaging device;

determining a predetermined set of interactive areas on the interaction surface as function of its topology and size; and associating with each interactive area at least one touch gesture interaction control.

More advantageously, the method additionally comprises the steps of:

associating with the predetermined set of interactive areas, at least one interactive volume, each interactive volume being located above said interactive area along a normal vector to that interactive area; and associating to each interactive volume with a predetermined three-dimensional touch-less gesture interaction control.

And finally, the method comprising the display of a predetermined visual feedback on a graphical user interface on the interaction surface according to any of the previous embodiments which may further be operated using at least one of: a portion of a body of a user, a desk table, a wall, an infrared translucent surface, and an object, the graphical user interface being projected onto the interaction surface.

BRIEF DESCRIPTION OF THE DRAWINGS

For a better understanding of the present invention, reference will now be made by way of example, to the accompanying drawings in which.

DESCRIPTION OF THE INVENTION

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

The present invention provides a method and a system for enabling multimodal touch and touch-less human gesture based interactions with a computerized system having at least one Graphical User Interface (GUI) displaying visual feedback information. The graphical user interface may display parameters such as buttons, scroll bars, knobs, pointers, windows, media content or any other parameters among those known from the state of the art. Control commands may be associated with each displayed parameter for operating the interactive system. Each control command may be associated with a trigger event controlled by detection and recognition of at least one predetermined specific gesture.

A predetermined specific gesture may be a touch or a touch-less human gesture. Touch gesture based interactions form a first mode of multi-modal gesture interaction and touch-less gesture based interactions form a second mode of multi-modal gesture interaction. Using the two modes of interactions together, sequentially or simultaneously, forms a multi-modal gesture based interactive system for being operated from information data obtained from a single sensing system.

For example, a predetermined specific gesture may be a three-dimensional pose based gesture of a tracked hand in which a three-dimensional (3D) point cloud of that hand captured by the imaging system has a specific arrangement corresponding to a specific pose. The detection of this pose is being performed using Classifiers and Machine Learning Techniques for Image Processing and Computer Vision. Any one of a neural network, a SVM classifier or a Random Forest classifier (or other suitable classifiers) performs well, that is, have a detection ratio higher than 85%, with a set of predefined specific three-dimensional gestures and appropriated descriptors.

The predetermined specific gesture may be a three-dimensional motion based gesture of a tracked hand in which the 3D point cloud of that hand captured by the imaging system, or at least one associated point of interest, such as, but not limited to, a point corresponding to a hand palm centre point or to a finger tip, demonstrates the performance of a specific dynamic movement in space, the associated three-dimensional path of which being statistically analysed to determine, from a set of descriptors, which shape has been performed. Each shape may be associated with a three-dimensional gesture. For example, if motion of a moving tracked hand performs a circular motion within a predetermined area in the frustum of the imaging system, a circle gesture may be detected accordingly. It is to be noted that the quality of the descriptors is key. A high quality relevant object movement descriptor may be its averaged speed over the time, a set of positions where movement as demonstrated a change of direction along one of the axis of a coordinate system, the acceleration, a duration, the size of the motion, etc.

Three-dimensional motion based gestures and three-dimensional pose based gestures are termed together three-dimensional gesture hereinafter. They may be performed and thus detected at the same time, and consequently they may trigger a control command if enabled by the interactive system. Practically, selection of one or the other is predetermined specifically for each type of interaction. For example, a fast moving hand from left to right within the scene may trigger a "swipe" right control command if enabled by the application. In such a case, for example, a media content may be replaced by another content. In another example, if detection of a "grabbing" three-dimensional posed based gesture is made at a specific position on a graphical user interface (GUI) representation of a scroll bar or button and that "grabbing" gesture is maintained while the position of the hand moves along the axis of the scroll bar of the GUI, the representation of the scroll bar button will move accordingly and content displayed, such as a map, will scroll accordingly until the "grabbing" gesture is detected as being released or as no longer being performed.

Detecting the performance of a touch gesture is made relative to a predetermined interactive area on the interaction surface. Multi-touch gestures are determined in the same way but are relative to a plurality of interactive areas of the interaction surface. This detection comprises tracking a three-dimensional position, with respect to or over time, of at least one portion of at least one tracked object. It further comprises the step of determining continuously the distance of each tracked portion of object, that may be a fingertip of a hand, to the closest interactive area predetermined on the interaction surface. It further comprises the step of triggering the event of the touch-gesture or multi-touch gesture at each interactive area where a least one portion of the tracked object has its distance from the interactive area below a predetermined threshold, for example, the threshold may be 0.1 mm, or if the distance is equal to zero (0). Each single touch gesture triggers a control command according to the interactive area with which it is associated or to which it belongs.

For example, a simultaneous control using multi-touch gestures may be enabled with a GUI displaying a keyboard in which three simultaneous touch-gestures on the GUI and their associated interactive areas correspond to the "CTRL" button, the "ALT" button, and the "DEL" button, and which, when performed together, operate a control command for displaying a new menu.

Simultaneous control using a combination of at least two gestures of same mode or of different modes is also possible, for example, a multi-touch control performed with one hand while the other hand performs a three-dimensional motion based gesture. Sequential combinations of different gesture interactions modes may also be enabled.

The present invention is characterized in that it uses an interaction system comprising only one sensing system as data information provider to the computation means or processor which determines both the two different modes of interactions, namely the touch gesture and the touch-less gestures interactions. Touch-less gesture interactions may also be termed hereinafter as "contactless gestures", "three-dimensional (3D) gestures" or "three-dimensional (3D) touch-less gestures".

As described above, the displayed GUI may comprise a plurality of parameters which may be contextually associated with at least one interaction control means. An interaction control means is a computerized system instruction which will perform a predetermined computation when triggered. The result of the predetermined computation may optionally be rendered as feedback information according to feedback means of the computerized system, using at least the graphical visual feedback from the GUI, and, optionally, audio feedbacks if an audio rendering system is included in the multi-modal interactive system. For example, a button on a user interface may be associated to a "close window" operation or a "read media" action the computerized system will operate. If a user interaction triggers the starting of that operation, the computerized system will operate the closing of the opened windows and its rendering into the GUI, and launch the media player generating audio feedback through an audio system while the GUI will display and update the status of a media player progression bar.

Each parameter to be controlled by a user interaction which may be associated with at least one predetermined interactive area at the surface of the interaction surface with which the user is intended to interact.

Each so-defined interactive area is intended for being used with touch gestures interactions. Preferably, the area associated with a parameter will be of a size corresponding to the rendered representation of that parameter on the interaction surface. This prevents triggering a gesture based interaction which belongs to a neighbouring parameter if the parameters are too close together. However, for ease of use, some parameters may contextually have an interactive area of different size (either smaller or larger) than their graphical representation on the interaction surface.

Similarly, each parameter, or a sub-parameter of that parameter to be controlled by the user interactions may be associated with at least one predetermined interactive volume, that is a three-dimensional interactive area, the position of which is preferably on top of the interactive area of a visual feedback rendered on the interaction surface. The size, position and shape of the interactive volume may contextually be predefined according to the interaction being supported by the application. Interactive volume controls are preferably intended for use with three-dimensional gesture interactions.

For example, an interactive volume may be associated with the control of the volume of an audio system. The interactive volume may be located on top of a speaker representation displayed on the GUI. When the user performs a touch interaction, using at least a portion of his hand, with the interactive area on the interaction surface associated with the speaker representation, the interactive area having the size of the speaker representation, the computerized system is instructed that a volume control interaction starts. Displacement of the hand of the user subsequent to the touch interaction constitutes a continuous three-dimensional gesture interaction control for which the distance in between at least one portion of the hand, for example, the palm or one predetermined finger, to the surface of the interactive area, determines the value of the audio volume adjustment (or control) parameter, that is, the further away (or higher) the hand is away from the interaction surface, the higher the audio volume, and, the closer (or lower) the hand is to the interaction surface, the lower the audio volume.

In one further embodiment, the value of the audio volume may be continuously adjusted as function of the movement of the hand up until the hand exits an interactive volume associated with the interactive area, and hence, the audio volume control. In one another embodiment, the audio volume may be continuously set as function of the distance of the hand to the interaction surface and fixed after a predetermined period of time. In one another preferred embodiment, the audio volume may be continuously set as function of the distance of the hand to the interaction surface and fixed when the tracked hand, within the interactive volume, performs a predetermined three-dimensional gesture, namely, a static gesture or a pose, such as a "pinch" or "grab" gesture, where predetermined fingers, for example, but not limited to the index and the thumb, are detected as coming close from one to the other below a predetermined distance threshold. In one embodiment, the distance threshold may be as low as 1 mm.

In the latter example, it will be understood that the speaker representation on the GUI is a GUI parameter with an interactive area associated with a start "audio volume control" interaction operation triggered when a touch interaction is detected, and that the volume interaction is associated to a "volume value control" sub-parameter operated as function of the detection of a predetermined subsequent three-dimensional gesture interaction.

As described herein, the invention comprises a method including tracking of at least one portion of at least one object within the frustum of the three-dimensional imaging system. The object may be a hand, and, a portion of the object may be a finger or a fingertip. It will be appreciated that detection and tracking of points of interests is not the object of the present invention and that several techniques may be applied to obtain similar requested input. For example, once the interactive system setup is set, a static background learning technique may be applied to register captured scene background, and a background removal technique, such as a morpho-mathematical depth image subtraction, may be applied at run-time to dissociate, frame-by-frame, moving objects of interest in the foreground of a captured scene from the static background. Considering depth map acquisition of the imaging sensor device, a 3d point cloud of the hand of a user may be obtained. A 3D point cloud clustering technique constrained at least by cluster size may then be applied on the foreground points corresponding to the hand, and a graph of adjacency used to determine extremities by detecting which clusters are connected to only one other cluster. Identification and tracking of objects, or parts of objects, may be performed efficiently using classification techniques, such as the Random Forest classifier, if applied to properly segmented data using, for example, a mix of K-means and leader-follower clustering. Combining background removal with clustering and classifier techniques provides a way to detect, track and identify each portion of a known object with known or learned 3D shapes intended to be used for interaction.

Figure 1:
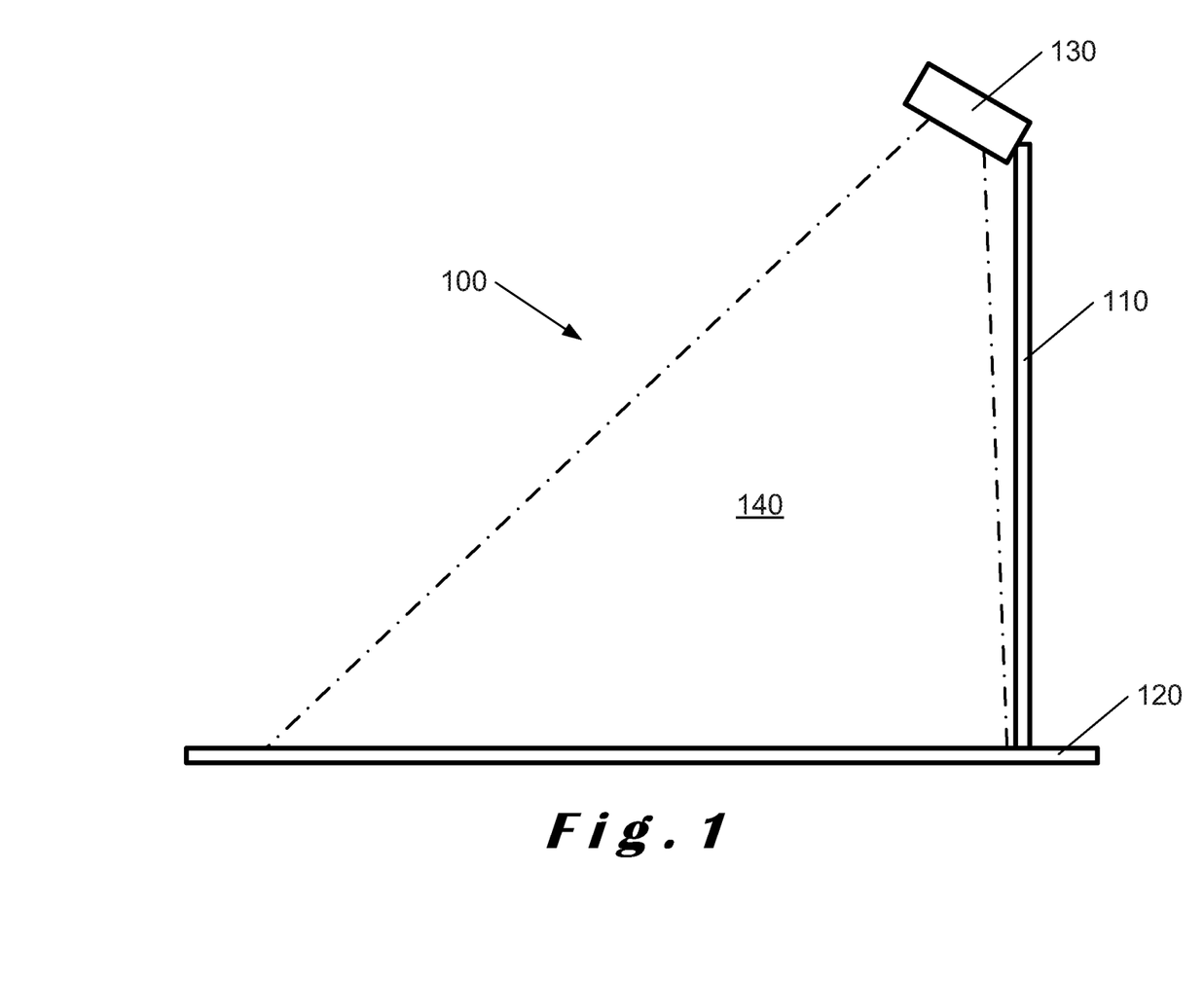
FIG. 1 illustrates a schematic side view of an interactive system in accordance with the present invention, the interactive system comprising an interaction surface onto which a graphical user interface is projected, an additional display screen, and projection and depth sensing elements with a top mounting assembly.

If the interaction method is compliant with any kind of display system having at least one display screen, a plurality of displays may used in combination, such as, for example, as shown in FIG. 1 where a conventional display screen 110 such as a LCD screen is associated with an interaction surface 120 onto which a GUI may be displayed using projection means. Gesture based interactions may enable a user to transfer parameters, such as a media content, from the GUI of one display screen to the GUI of the one another. More precisely, the transfer command may be triggered after a touch gesture has been detected at the position the parameter was displayed on a first GUI, initiating the interaction which may subsequently be enabled and performed by detecting the performance of a "grab-slide-release" gesture sequence towards the direction of the second GUI to which the content parameter is to be transferred.

In a preferred embodiment of the present invention, the GUI is displayed using a single display system due to the use of projection means, such as a projector or a pico-projector, which provides visual feedback to the user during the interaction. This is illustrated in, and described with reference to, FIGS. 5 and 6 below.

The projection may be operated onto a wide variety of surfaces and materials. The term "surface" as used herein refers to any surface onto which images can be projected. Suitable surfaces include, but are not limited to, screens, flat surfaces, curved surfaces, and transparent surfaces.

In the simplest embodiment of the present invention, the GUI may be projected onto a planar desktop table or a flat wall which will be used as display support defining the human-to-computer interaction surface. However, the GUI may also be projected onto non-planar surfaces, such as an object having circular shapes, for example, a balloon, or a portion of a body of a user, such as a forearm or the inner part of a hand palm.

In a preferred embodiment, the material being used as both a display screen and an interaction surface, may demonstrate substantive diffusing properties for electromagnetic radiation having wavelengths within the (human) visible portion of the electromagnetic spectrum. Substantive diffusing properties means that the material is diffusing at least ten percent (10%) of the incident light to enable a proper rendering of the visual feedback to be displayed. The projection system light power output may be adapted accordingly.

Preferably, electromagnetic radiation belonging to the incident light beam having a wavelength range between 400 nm and 680 nm may be diffused in a "Lambertian" way, that is, homogeneously for all reflecting angles possible when user is on same side of the interaction surface as the projection means, or for all transmission angles possible when user is on the opposite side of the interaction surface as the projection means.

Lambertian reflectance is a property that defines an ideal "matte" or diffusely reflecting surface. The apparent brightness of such a surface to an observer is the same regardless of the angle of view of the observer. More specifically, the luminance of the surface is isotropic, and, the luminous intensity obeys Lambert's cosine law.

In an even more preferred embodiment of the present invention, electromagnetic radiation of the incident projected light beam having wavelength above 680 nm, that is, in the infrared domain, may be transmitted with a high transmission coefficient ratio (for example, greater than 20%) and without substantive diffusion, that is, within a solid angle of less than 20 degrees when the user is positioned on the opposite side of the interaction surface with respect to the three-dimensional camera. When the user is positioned on the same side of the interaction surface as the three-dimensional camera, a material with a low infrared (IR) reflection coefficient ratio of less than 20% is preferred while demonstrating a substantive high diffusion ratio of more than 60 degrees of solid angle to avoid IR specular reflection into the imaging system which is capable of destroying the reliability of depth measurement values.

The present system for enabling multi-modal touch and touch-less human gesture based interactions with a computerized system is characterized in that it comprises a single sensing system. The single sensing system as used herein as a data information provider comprises a three-dimensional sensing system, for example, a three-dimensional sensing system may be a three-dimensional (3D) imaging system or camera. Preferably, the present multi-modal touch and touch-less human gesture based interactive computerized system will make use of 3D camera using IR illumination of the scene to obtain better depth measurements. A passive IR 3D camera, such as stereo vision or structured light 3D camera, may be suitable with the computerized system, however, active illumination based 3D cameras, such as depth sensing or Time-of-Flight (ToF) cameras, are preferred. Even more preferably, the imaging system may further embed both a 3D camera together with a colour camera of a similar or of a higher resolution. Each of the depth sensing or ToF camera and the colour camera has a frustum that at least overlaps with each other and which enable capture of the entire interaction surface in which movements and gestures of at least one portion of at least one hand or object can be detected, tracked and used for determining controlling parameters of the projected GUI.

The term "frustum" as used herein refers to the field-of-view of the imaging element, for example, a cone volume extending from a lens to a surface. It also refers to a projected view of an image from a projector, for example, a cone extending from the projector lens to a surface. In each case, the area on the surface may be defined by an ellipse, a circle, or a rectangle if the projection is collimated the same.

The terms "three-dimensional camera", "depth sensing camera" or "time-of-flight (ToF) camera" as used herein refer to a video or still camera that provides three-dimensional coordinates for each pixel in an image of a captured scene. Two of the dimensions (X and Y) are determined by an X-Y plane which is normal to an axis of the camera, and the third dimension (Z) is a distance of the pixel from the camera to the imaged surface. Such a camera produces a three-dimensional point cloud where each point in the cloud corresponds to a pixel having three-dimensional coordinates. The 3D point cloud or the corresponding depth map provides values correlated to the camera coordinate system and correlated to the interaction surface (or world) coordinate system when a calibration method from the state of the art is utilized to apply a transformation matrix to project data values from one coordinate system into the one another.

In addition, the terms "colour camera" or "RGB camera" as used herein refer to a video or still camera that provides colour images of a captured scene. Such a camera produces a two-dimensional colour image for each pixel in the captured scene. The colour camera and the three-dimensional camera associate each depth measurement value (if referring to the camera coordinate system) or 3D point (if referring to the world coordinate system) with a colour together when using image registration techniques from the state of the art. In one embodiment, the imaging system comprising at least a three-dimensional camera to extract depth information from the scene, and a colour camera of a higher resolution. The higher resolution of the colour sensing unit that images the same scene as the depth sensing unit may be used for accurate localization and determination of touch gestures on an interaction surface displaying the graphical user interface. Conventional image registration techniques may be used for associating each depth sensing pixel with each colour sensing pixel, the higher resolution of the colour sensing unit being used to refine raw X-Y positions obtained from the lower resolution depth sensing camera to provide a more accurate X-Y position on the display surface which is also of high resolution.

The present invention will now be described in more detail below with respect to FIGS. 1 to 6 which relate to specific embodiments encompassing the scope of the present invention.

The method of the present invention comprises detecting the performance of a touch gesture relative to a predetermined interactive area on the interaction surface. It also comprises a step of predetermining the interactive areas contextually with a graphical user interface to be displayed and the control commands enabled for interacting with it. In a preliminary step, the interaction surface is detected and at least one of its position, shape, and, topology, that is, the modelling of the surface is registered.

According to the system operating the method, the detection of the interaction surface may be performed once, for example, at start-up of the multi-modal gesture based interactive system when the interaction surface is fixed, that is, not moving, and of a known shape, such as a flat panel, desk or surface, the detection process may be performed manually or automatically. When the interaction surface is able to move and have a varying shape, for example, when the interaction surface is a forearm of a user, the detection must be performed automatically in real-time.

In a first embodiment in which the detection is performed manually with a static flat surface arranged in space in the system so that its surface is within the frustum of the imaging system, the user of the interactive system may, in a first step, use a simple white paper sheet placed on top of the surface, the size of which is defined to be of the size of the interaction surface. The white paper sheet reflects IR illumination from an active IR depth sensing camera, for example, a ToF three-dimensional camera. However, if the IR reflecting property of the surface, without the sheet of white paper, is strong enough, that is, at least 20% of the incident light, the white paper sheet is not mandatory.

In a second step, the distance of the designated interaction surface to the sensing system is measured using the sensing system. Depth data acquired may be used in a third step using computer vision methods to determine a plane within the acquired 3D data set, 3D point cloud or depth map. Plane detection methods, such as conventional plane fitting algorithms, for example, 3D least squares plane, Ransac or any other linear algebra based method, may be used. The input required to determine the geometrical properties of the plane must comprise at least four points spread over the surface of the interaction surface. Preferably, if limited to four points, these points need to be chosen as the corners of the interaction surface. Once the plane is determined, each of its points can be located as function of their distance to the imaging system, and as a function to any point within the frustum of the imaging system. The depth measurements, providing real distance measurements, may be used as criteria for determining thresholds to be used for gesture recognition purposes in a subsequent step.

Figure 3:
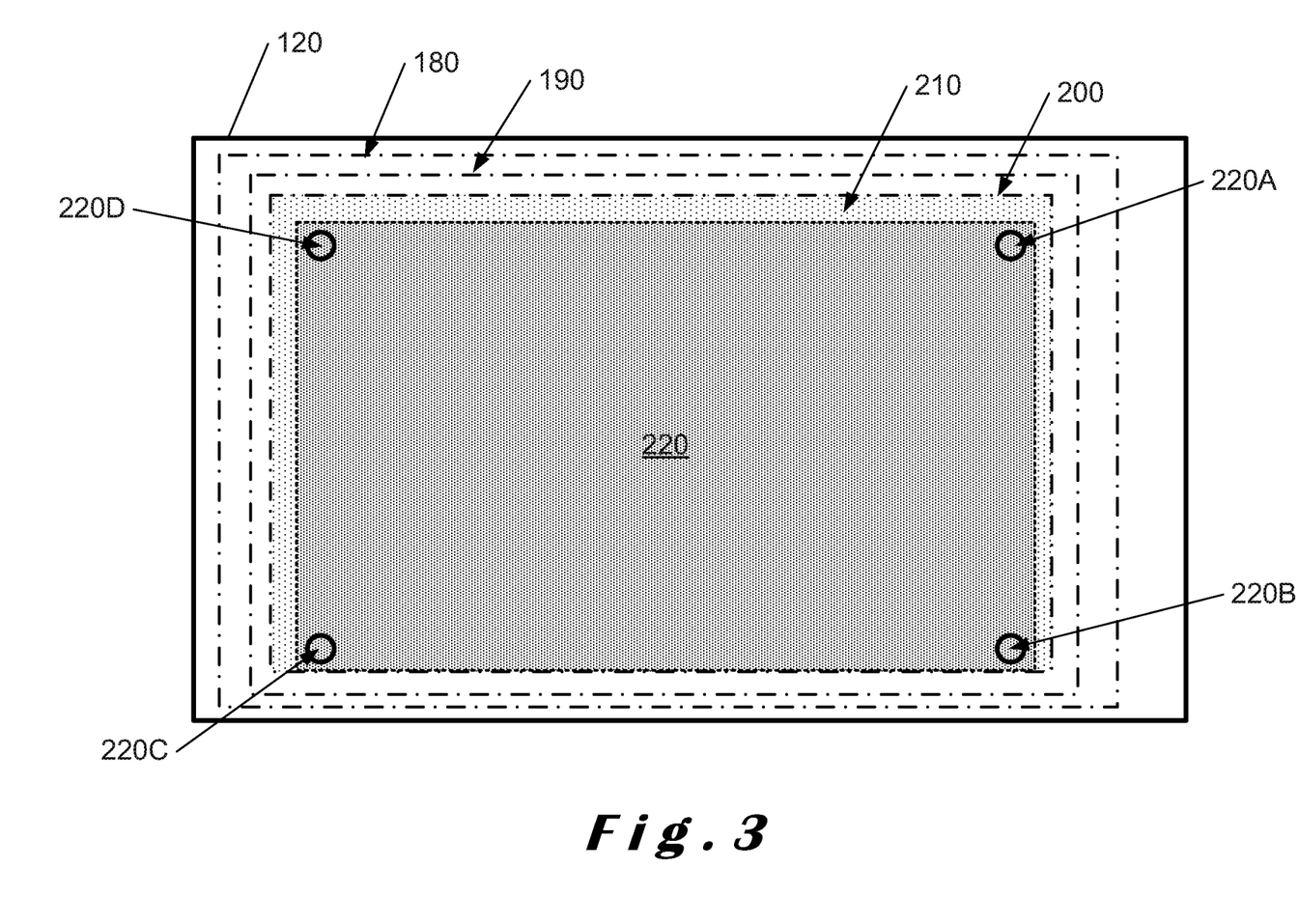
FIG. 3 illustrates a plan view of a surface associated with the interactive system of FIGS. 1 and 2 wherein the interactive area is embedded within the surface of the interaction surface.

Similarly, same interaction surface detection and determining steps may be performed automatically with a static flat surface arranged in space in the system so that its surface is within the frustum of the imaging system. As illustrated in FIG. 3, the flat interaction surface may comprise a set of four points highly reflective to IR illumination which replace the at least four points measured on the white paper sheet of the manual detection and determination steps, each point again being located at a corner of an area defined to be the interaction surface.

In one another manual implementation of the interaction surface detection and determining step, the set of four points which are highly reflective to IR illumination may not be on the interaction surface. The user will use his fingers to pinpoint sequentially in time the four corners of the interaction surface. The imaging system will additionally be operated to detect and track a specific fingertip, and to register sequentially the three-dimensional position in space of each of the four corners.

In any of the previously described implementations, an offset of, for example, 3 mm, may be applied in the vertical direction (Z) along a normal to the plane of the interaction surface. This provides compensation for depth measurement accuracy issues of the 3D imaging device, and to ensure that a moving object which is detected as being almost in contact with the interaction area, that is, for example, at a 2 mm distance, may still be able to trigger a touch-gesture event where possible.

In one another embodiment of the present invention where the three-dimensional position of the projector is known with respect to the position of the three-dimensional camera, for example, if they are both on the same side of the interaction area, and are statically embedded onto a hardware system, such as a laptop, a helmet or embedded into smart glasses, the projection parameter setting, namely the focus, the keystone, the zooming, and the graphical user interface layout size can be automatically modified by extracting distance, topology and geometrical information related to a potentially moving interaction surface to adapt the rendering of the graphical user interface layout size. This may be done by recovering from geometrical distortion using triangulation methods.

The detection and determining of the interaction surface and, that of the display surface, can be performed continuously even when the display surface may move with respect to time. For example, when the display surface is a specific object or a portion of the a body of a user, for example, the forearm or the inner side of a palm, and if the three-dimensional camera and the projector are mounted onto a helmet or into smart glasses, using image processing means such as pattern recognition or classifier techniques, provides reliable detection and tracking of the forearm used as an interaction surface within the three-dimensional space. The position and orientation of the tracked forearm may further be determined by progressively accumulating a topological model of the tracked moving object using any simultaneous location and mapping algorithm (SLAM) from the state of the art, the topological model being a three-dimensional representation of the interaction surface, the exact position and orientation of the representation being determined from frame-to-frame, and any position of the display surface can be determined using simple three-dimensional geometrical computations such as triangulation.

Referring initially to FIG. 1, a schematic side view of an interactive system 100 in accordance with the present invention is shown. The system 100 comprises a screen 110 positioned on a surface 120, and an imaging unit 130 associated with the screen 110. The screen 110 may be any suitable screen which can be connected to a data source (not shown) for displaying images. The imaging unit 130 is positioned to have a frustum 140 which extends to the support surface 120.

In the embodiment shown in FIG. 1, the imaging unit 130 is mounted directly on the screen 110. However, it will readily be appreciated that the imaging unit 130 may be mounted in any other suitable way such that it has the same frustum 140 but is either embedded or separately mounted with respect to the screen. In addition, the screen 110 is shown supported by the surface 120. Again, it will be appreciated that the screen can be supported in other ways.

Figure 2:
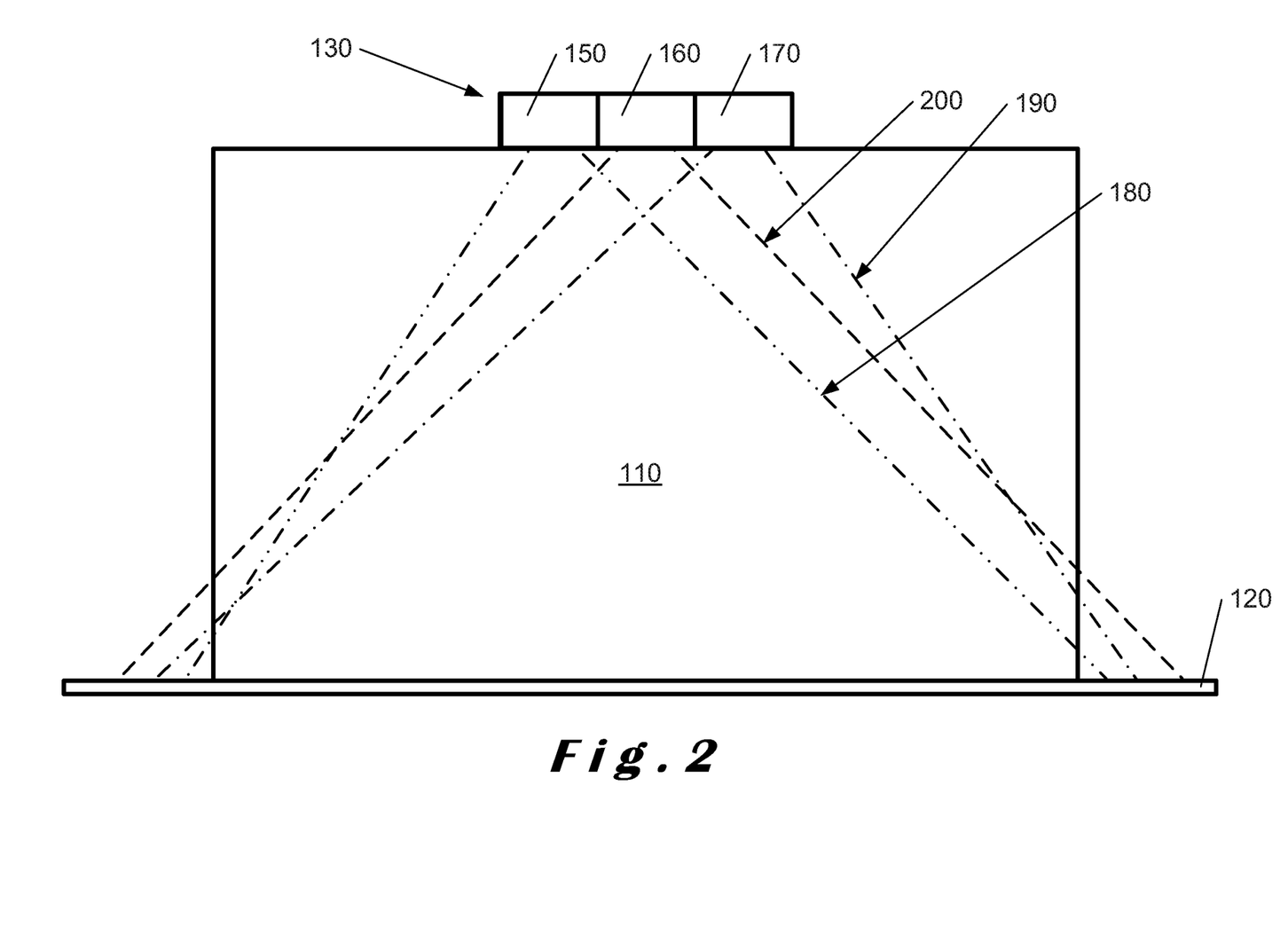
FIG. 2 illustrates a schematic front view of the interactive system of FIG. 1.

In FIG. 2, a schematic front view of the interactive system 100 is shown. The imaging unit 130 comprises three separate imaging elements 150, 160, 170. Whilst the imaging elements 150, 160, 170 are shown integrated into a single imaging unit 130, it will be appreciated that each of these elements can be individually located with respect to the screen 110 and with respect to the surface 120 whilst providing the same functionality as will be described in more detail below.

Imaging element 150 may comprise a colour or RGB camera which captures two-dimensional colour images of a scene within its frustum 180 (indicated by two dash-dot-dot-dash lines). The imaging element 150 produces images which are used for image registration with images of imaging element 170, both being within the interactive system of the present invention, and as described in more detail below.

Imaging element 170 may comprise a depth sensing or ToF camera which captures three-dimensional images of a scene within its frustum 190 (indicated by two dash-dot-dash lines). The images produced by the imaging element 170, when processed, provides three-dimensional positional information for objects within its frustum 190 which can be used for interaction with a graphical user interface (GUI) projected onto the surface 120 as will be described in more detail below.

Imaging element 160 comprises a projector which is connected to computerized system. It may project the same images provided to the screen 110 onto the surface 120. The imaging element 160 projects the images into a frustum 200 (indicated by two dashed lines). In one embodiment, the projected images are colour images comprising a GUI with at least one parameter which is displayed onto the surface 120.

As shown in FIG. 2, there is an overlap, on the surface 120, of the frusta 180, 190, 200 of each of the imaging elements 150, 160, 170.

FIG. 3 illustrates a plan view of the surface 120 indicating areas which are within the frusta of the imaging elements 150, 170 together with the area 200 onto which the imaging element 160 projects images. As shown, each area is outlined by the same line type as shown in FIG. 2 and comprises, for example, a rectangle. Naturally, depending on the particular imaging elements, the frusta may be different, for example, an ellipse or a circle.

As shown in FIG. 3, an area 210 is common to the frusta 180, 190, 200. An interactive area or region 220 is also shown within the common area 210. The interactive area or region effectively comprises a volume extending from the interaction surface in a direction towards the ToF imaging system. Once the interactive system has been calibrated, movement of any object within the interactive region 220 can be used to control an image on the screen.

In one embodiment of the present invention wherein planar surface such as a desktop is used as interaction surface, calibration of the interactive region 220 is achieved by defining a subset of four points 220A, 22013, 220C, 220D which correspond to corners of a rectangle on the surface within the common area. The calibration process may be a preliminary step wherein a user may perform only once the placing of at least a portion of at least one hand, for example a finger, in each of the corners sequentially to define the interactive area on the surface 120 onto which a graphical user interface (GUI) is projected by the imaging element or projector 160. In the calibration process, positions in three-dimensional space of the finger is recorded sequentially for each of the four points, and a plane is determined as being the surface delimited by the four points from geometrical computations. Any position belonging to the so determined surface, that is, having same height as that surface, and horizontal and vertical coordinates within the limits of the surface, are points which form an interaction surface and its associated interactive area.

In one another embodiment of the present invention wherein planar surface, such as a desktop is used as interaction surface, calibration of the interactive region 220 may be achieved in line with an automated process at start-up. The automated process may comprise detecting, using pattern recognition techniques, the pattern of four stickers formerly stuck onto the interaction surface so has to determine physically its limits. Pattern recognition may comprise using at least one of the shape, the colour, and the texture of the four stickers. Once the stickers detected with each imaging system, calibration comprises transforming position data from each imaging system into position data from one another imaging system. For example, horizontal X and vertical Y data from the colour camera may be projected into the three-dimensional camera coordinate system using regular image registration transformation models, such as a simple linear transformation or preferably thin-plate or surface splines, multiquadrics transformations.

The X-Y positions respectively of the colour camera, the 3D camera and the projector are registered with respect to one another so that any X-Y position of a parameter from any of those systems can be associated with depth information. Associating an X-Y two-dimensional (2D) coordinate of a parameter with a third coordinate related to depth information is forming a 3D coordinate. As a consequence, the calibration enables each parameter from the imaging system 130 to be associated with a three-dimensional position in space and with a colour with respect to any position on the determined interaction surface which forms part of interactive area 220.

Figure 4:
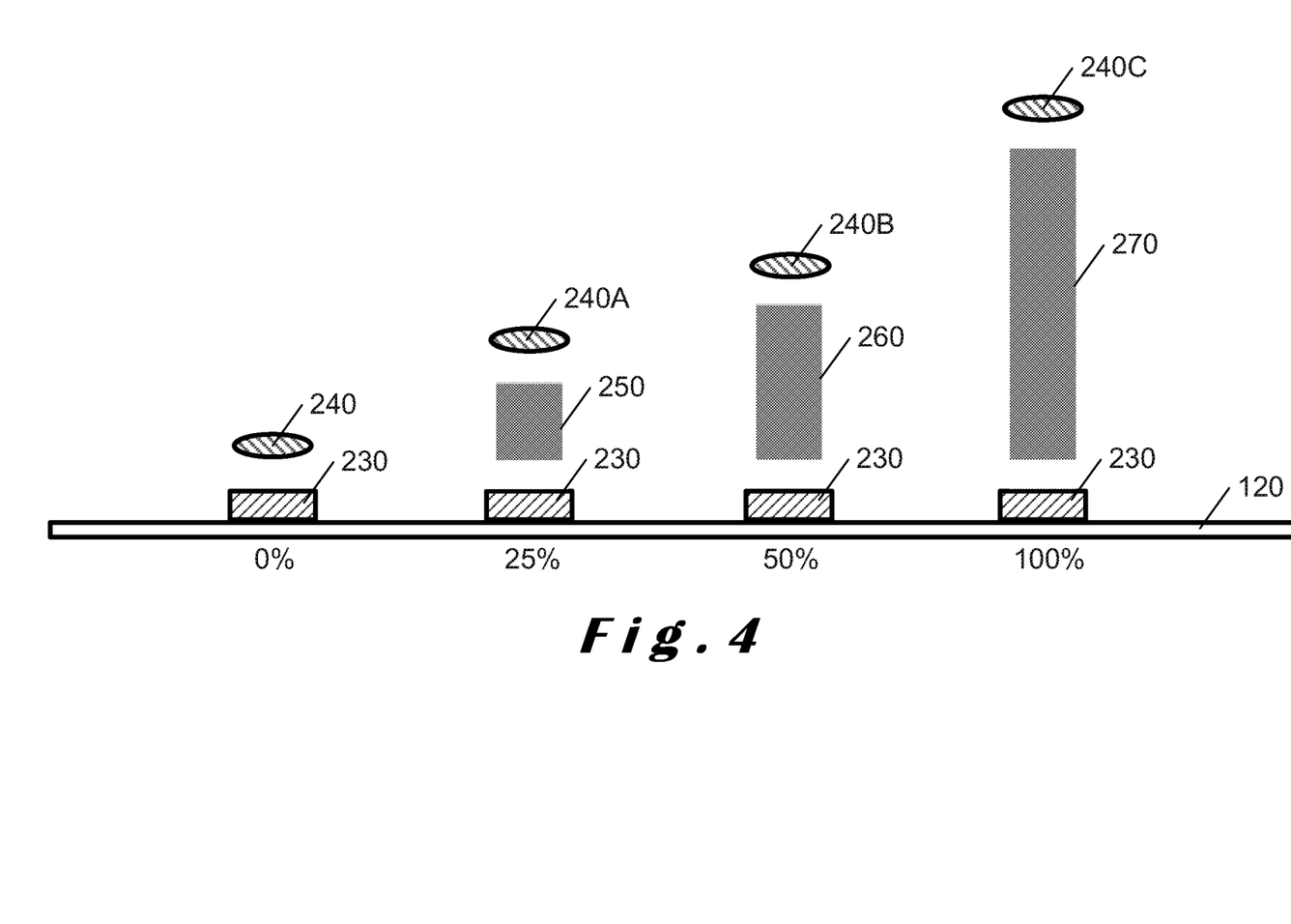
FIG. 4 illustrates four different positions of a tracked element used for controlling a three-dimensional interaction using the interactive system of the present invention, where the position of a tracked element is determined as function of the interaction surface, and where the four different positions respectively determine a touch gesture interaction control and three three-dimensional gesture interaction controls.

As described above, in one embodiment of the present invention, the GUI may comprise at least one portion over which movement of an object relative thereto in a direction perpendicular to the plane of the surface 120 can control a parameter, for example, an audio volume control. In FIG. 4, an example of the implementation of a volume control is shown and will be described in more detail below.

The identification of an object within the interactive region 220 is determined using imaging element 170, that is, the depth sensing or ToF camera. A three-dimensional point cloud is processed first to identify the object and then to track its movement from frame-to-frame. Tracking the object provides the interaction which is used to control the GUI; the movement of the object 240 away from the surface 120 in the direction perpendicular thereto is tracked to provide control signals for the volume controller.

More precisely, a portion 230 of the GUI, that is, an interactive area corresponding to the position of a GUI parameter, can be considered to be a controller, and, when an object 240, such as, a finger or a hand, is placed in contact with the surface over the portion and moved in a direction away from the surface 120 onto which the GUI is projected in a predetermined direction, the controller is operated to change the level of the volume associated with a projected image. At the position represented by 0%, the volume is at 0 or off. Movement of the object 240 from the 0% position to a first predetermined distance from the portion 230, the volume is increased to 25% of the maximum volume. Movement of the object 240 to a second predetermined distance from the portion 230, the volume is increased to 50% of the maximum volume. Movement of the object to a third predetermined distance from the portion 230, the volume is increased to the maximum volume. Naturally, although only three levels are shown in FIG. 4 by way of example, it will be appreciated that any suitable number of levels can be implemented in accordance with other predetermined distances from the surface.

Although movement of an object in a direction perpendicular to the surface is described, it will be appreciated that any other movements relative to the surface may also be used to control the GUI, for example, dynamic movement, such as a rotation, which may be detected when considering a hand of a user as a function of the change in position of a set of at least three points of interest, which may be the thumb tip, the index tip and the middle of the wrist. Point of interest detection and tracking can be performed according to various methods, such as principal component analysis, on the mask of the hand or any other suitable extremity detection.

Figure 5:
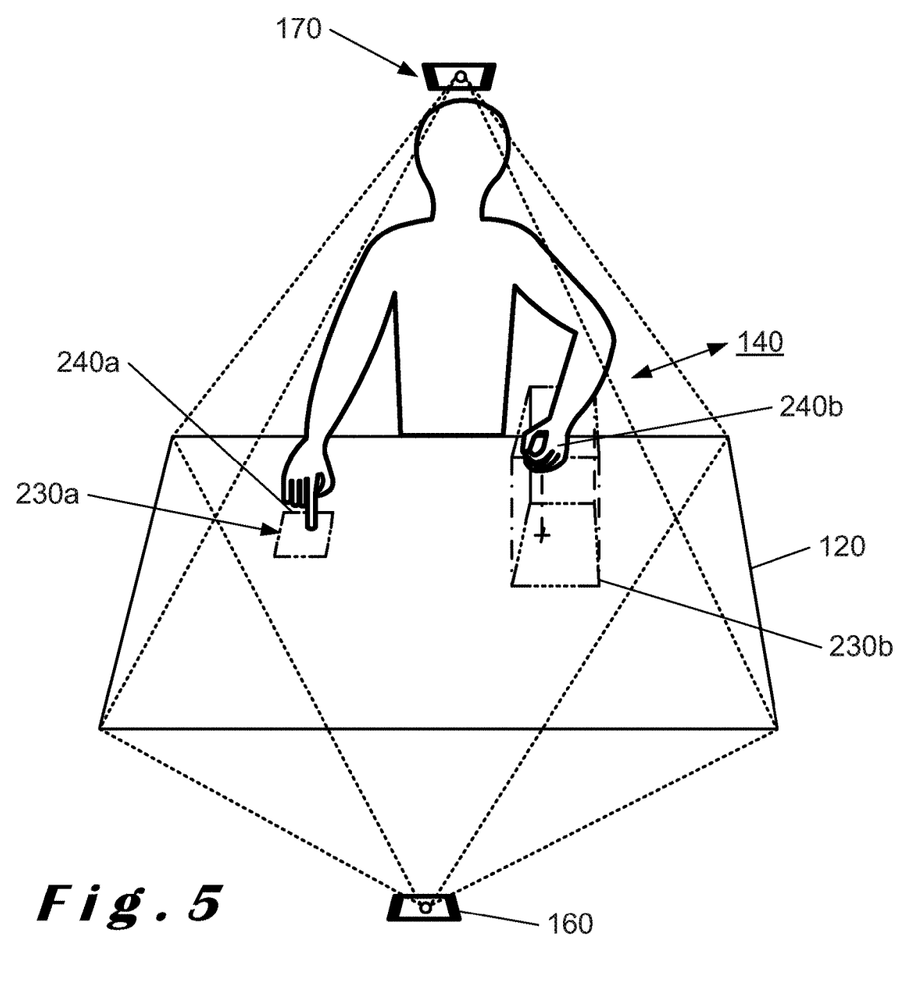
FIG. 5 illustrates one embodiment of the interactive system of the present invention in which a colour diffusing surface displays a rear projected graphical user interface and touch gesture interaction of a first tracked hand is used in combination with a three-dimensional gesture interaction of a second tracked hand.

In FIG. 5, an embodiment of the interactive system of the present invention comprises a rear projection display diffusing colours of the graphical user interface using a projector 160. An interaction surface 120 is used for touch gesture interactions at a contextually predetermined touch gesture interaction area 230*a* of a first tracked hand 240*a* in combination with a three-dimensional gesture interaction determined from a second tracked hand 240*b* and occurring in an interaction volume of a predetermined size which extends along a normal to the interaction surface 120 over a second contextually determined interaction area 230*b*, the tracking using a front mounted depth sensing camera 170 situated on top of the interaction surface 120 and on the opposite side to the projector with respect to the interaction surface 120.

In the embodiment illustrated in FIG. 5, the interaction surface must demonstrate specific properties with respect to light. It must diffuse wavelengths in the visible part of the electromagnetic spectrum so that the projected graphical user interface can be seen by the user, while being transparent to IR to avoid saturating or disturbing depth measurements onto IR sensors when using an active IR depth sensing camera, such as a ToF 3D camera, due to specular or high reflections from the material of which the interaction surface is made.

Such photonic properties for such a surface are difficult to obtain, and a few solutions may be provided. These include, but are not limited to, for example, the use of a glass window or a polycarbonate window having a surface onto which a coating may be applied. The coating may be made of zinc sulfide (ZnS) pigment particles or zinc sulfate (ZnSO$_4$) particles in a proportion of 10% of the substance used for applying the coating. Barium sulfate (BaSO$_4$) pigment may also be suitable as being considered as being the best visible spectrum light diffuser, and, as it do not introduce any chromatic aberrations when used as substrate as reflecting homogenously the wavelengths in the visible part of the electromagnetic spectrum in a Lambertian way.

An embodiment will comprise a coating onto a glass or polycarbonate window which will be printed with the substance to form a grid of coating substance onto the window. The pitch in between the coated tiny areas on the window as well as their size and arrangement may be adjusted as function of the colour diffusing properties expected.

Figure 6:
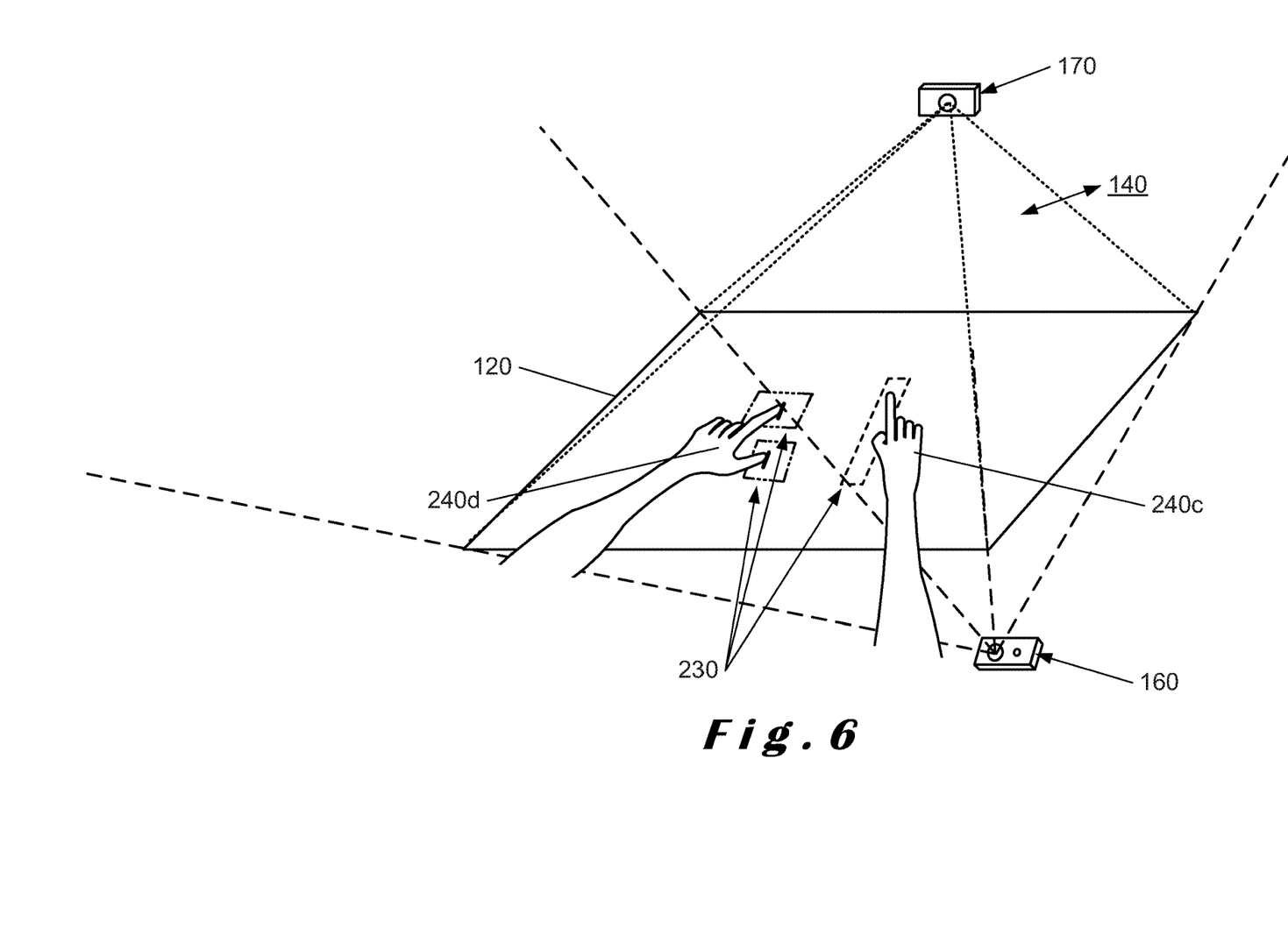
FIG. 6 illustrates another embodiment of the interactive system of the present invention in which a colour diffusing surface displays a rear projected graphical user interface and a multi-touch gesture interaction of at least two portions of a first tracked hand is used adjacent to another single touch gesture interaction determined from a portion of a second tracked hand.

In FIG. 6, another embodiment the interactive system of the present invention comprises a rear projection display diffusing colours of the graphical user interface using a projector 160. A determined interaction surface 120 is used for touch gesture interactions at contextually predetermined touch gesture interaction areas 230. A first tracked hand 240*c* performs a single touch-gesture interaction while a second tracked hand 240*d* is performing a multi-touch gesture interaction onto two different interaction area 230, the tracking using a depth sensing camera 170 with a frustum 140 situated on top of the interaction surface 120.

A preferred embodiment more suitable for enabling robust and powerful multi-touch gesture would be having the imaging sensing device on the opposite side to that of the user with respect to the interaction surface. Such an embodiment would provide a system where the main interacting parts of a hand of a user for touch-gestures, that is, the fingertips are never masked.

Although the present invention has been described with reference to specific embodiments, it will be appreciated that the invention is not limited to such embodiments, and that the invention can be implemented in other ways.

The invention claimed is:

1. A method for multi-modal touch and touch-less interaction with a computerized system in which said multi-modal touch and touch-less interaction is performed using data information from a single sensing system, the single sensing system being a three-dimensional imaging device including a camera, the method comprising:
   a) detecting and tracking, using the camera of the three-dimensional imaging device, at least one portion of at least one object within a frustum of the three-dimensional imaging device;
   b) initiating the interaction by determining, using the camera of the three-dimensional imaging device, if said at least one portion of said at least one object being tracked is performing a first predetermined touch gesture on a first predetermined interactive area on a first portion of an interaction surface and/or a first predetermined touch-less gesture in a first predetermined interactive volume on a vector axis normal to and not including a second predetermined interactive area on a second portion of the interaction surface; and
   c) interacting with the computerized system by detecting and recognizing, using the camera of the three-dimensional imaging device, one or more gestures performed by said at least one portion of said at least one object within the frustum of the three-dimensional imaging device, the detected and recognized one or more gestures comprising a second predetermined touch gesture on a third predetermined interactive area on a third portion of the interaction surface and/or a second predetermined touch-less gesture in the first predetermined interactive volume on the vector axis normal to the second predetermined interactive area on the second portion of the interaction surface or in a second predetermined interactive volume on a vector axis normal to and not including a fourth predetermined interactive area on a fourth portion of interaction surface.

2. The method according to claim 1, wherein detecting the performance of a touch gesture on the first predetermined interactive area of the interaction surface corresponds to detecting when said at least one portion of said at least one object being tracked is positioned in three-dimensional space at a same location in space as the first predetermined interactive area on the interaction surface.

3. The method according to claim 1, wherein detecting if the predetermined touch gesture has been performed is determined when a distance from the interaction surface of said at least one portion of said at least one object being tracked, in three-dimensional space, is below a threshold value.

4. The method according to claim 1, wherein determining a multi-touch gesture is performed when positions of at least two portions of said at least one object being tracked in space reach at least the first predetermined interactive area belonging to the interaction surface.

5. The method according to claim 1, further comprising determining touch gesture interaction controls as a function of successive positions and duration of a touch gesture and/or a multi-touch gesture.

6. The method according to claim 1, further comprising determining touch-less gesture interaction controls as a function of the touch-less gesture performed by said at least one portion of said at least one object being tracked.

7. The method according to claim 1, wherein (c) further comprises ending the interaction when a predetermined event is triggered, said predetermined event comprising at least one of: the elapsing of a predetermined time period, the recognition of a predetermined touch gesture on the interaction surface, the recognition of a predetermined touch-less gesture in the frustum of the three-dimensional imaging device, and an exit of said at least one object from a predetermined volume in three-dimensional space.

8. The method according to claim 7, wherein (b) comprises using a first detected and tracked portion of said at least one object, and (c) comprises using a second detected and tracked portion of said at least one object.

9. The method according to claim 7, wherein (b) and (c) are sequentially controlled using a single detected and tracked portion of one object.

10. The method according to claim 1, further comprising displaying visual feedback on a graphical user interface on at least the first and/or second portion of the interaction surface, the visual feedback being relative to at least one of: the position of said at least one portion of said at least one object and the recognized gestures of said at least one portion of said at least one object being tracked.

11. The method according to claim 10, wherein interaction with the graphical user interface displayed on the interaction surface further comprises:

d) determining a position in space and a topology of the interaction surface using the three-dimensional imaging device;

e) determining a set of interactive areas on the interaction surface as a function of the topology and size of the interaction surface; and f) associating with each interactive area in the interaction surface at least one touch gesture interaction control.

12. The method according to claim 11, further comprising:

g) associating with the set of interactive areas, at least one interactive volume, each interactive volume being located above said interactive area along a normal vector to that interactive area; and h) associating each interactive volume with a predetermined touch-less gesture interaction control.

13. The method according to claim 11, wherein the interaction surface comprises at least one of: a portion of a body of a user, a desk table, a wall, an infrared translucent surface, and/or an object, the graphical user interface being projected onto the interaction surface.

14. A system for interacting with a graphical user interface, the system comprising:

a display system configured to display the graphical user interface onto an interaction surface;

a three-dimensional imaging device comprising a camera and configured to track, using the camera, at least one portion of at least one hand of a user within a frustum of the three-dimensional imaging device; and a computer system configured to control the display system and the three-dimensional imaging device and to determine one or more gesture based interaction controls using data output from the three-dimensional imaging device, wherein the interaction surface is within at least a portion of the frustum of the three-dimensional imaging device and is substantially aligned therewith, wherein the computer system is configured to:

initiate an interaction by determining, using the camera of the three-dimensional imaging device, if said at least one portion of said at least one hand being tracked is performing: a first predetermined touch gesture on a first predetermined interactive area in a first portion of the interaction surface or a first predetermined touch-less gesture in a first predetermined interactive volume on a vector axis normal to and not including a second predetermined interactive area in a second portion of the interaction surface; and detect and recognize, using the camera of the three-dimensional imaging device, one or more gestures performed by said at least one portion of said at least one hand being tracked subsequent to said initiation of said interaction, wherein detecting and recognizing one or more gestures comprises detecting and recognizing a second predetermined touch gesture on a third predetermined interactive area on a third portion of the interaction surface and/or a second predetermined touch-less gesture in the first predetermined interactive volume or in a second predetermined interactive volume on a vector axis normal to and not including a fourth predetermined interactive area on a fourth portion of interaction surface.

15. The system according to claim 14, wherein the display system comprises a projector located on a same side of the interaction surface onto which the graphical user interface is displayed as the three-dimensional imaging device.

16. The system according to claim 14, wherein the three-dimensional imaging system and a projector are located on opposite sides of the interaction surface onto which the graphical user interface is displayed, the interaction surface being operable for diffusing radiation having a wavelength in a range which substantially corresponds to a visible part of the electromagnetic spectrum and for transmitting radiation having a wavelength in a range which substantially corresponds to an infrared part of the electromagnetic spectrum with limited diffusion, a transmission coefficient of the interaction surface being higher than 50% and a limited diffusion of the interaction surface being lower than 20 degrees.

17. A system comprising a three-dimensional imaging device including a camera and a non-transitory computer medium configured for storing executable instructions, which when executed on a computerized system, cause the computerized system to perform a method comprising:

a) detecting and tracking, using the camera of the three-dimensional imaging device, at least one portion of at least one object within a frustum of the three-dimensional imaging device;
  b) initiating the interaction by determining, using the camera of the three-dimensional imaging device, if said at least one portion of said at least one object being tracked is performing at least one of: a first predetermined touch gesture on a first predetermined interactive area on a first portion of an interaction surface and a first predetermined touch-less gesture in a first predetermined interactive volume on a vector axis normal to and not including a second predetermined interactive area on a second portion of the interaction surface; and
  c) interacting with the computerized system by detecting and recognizing, using the camera of the three-dimensional imaging device, one or more gestures performed by said at least one portion of said at least one object within the frustum of the three-dimensional imaging device, the detected and recognized one or more gestures comprising a second predetermined touch gesture on a third predetermined interactive area on a third portion of the interaction surface and/or a second predetermined touch-less gesture in the first predetermined interactive volume on the vector axis normal to the second predetermined interactive area on the second portion of the interaction surface or in a second predetermined interactive volume on a vector axis normal to and not including a fourth predetermined interactive area on a fourth portion of interaction surface.

18. The method according to claim 1, wherein the first portion of the interaction surface and the second portion of the interaction surface are different portions of the interaction surface.

19. The system according to claim 14, wherein the first portion of the interaction surface and the second portion of the interaction surface are different portions of the interaction surface.

20. The system according to claim 17, wherein the first portion of the interaction surface and the second portion of the interaction surface are different portions of the interaction surface.

* * * * *